US007753097B2

(12) United States Patent
Dangami et al.

(10) Patent No.: US 7,753,097 B2
(45) Date of Patent: Jul. 13, 2010

(54) LABEL MAKING APPARATUS

(75) Inventors: Akira Dangami, Tokyo (JP); Kenji Kobayashi, Tokyo (JP); Yoshiaki Sugishita, Tokyo (JP)

(73) Assignee: Lintec Corporation, Tokyo (JP)

( * ) Notice: Subject to any disclaimer, the term of this patent is extended or adjusted under 35 U.S.C. 154(b) by 816 days.

(21) Appl. No.: 11/632,712

(22) PCT Filed: Jul. 20, 2005

(86) PCT No.: PCT/JP2005/013270

§ 371 (c)(1),
(2), (4) Date: Jan. 18, 2007

(87) PCT Pub. No.: WO2006/011395

PCT Pub. Date: Feb. 2, 2006

(65) Prior Publication Data

US 2008/0029221 A1 Feb. 7, 2008

(30) Foreign Application Priority Data

Jul. 26, 2004 (JP) ............................ 2004-216944

(51) Int. Cl.
*B32B 41/00* (2006.01)

(52) U.S. Cl. ........................ 156/378; 156/379; 156/584

(58) Field of Classification Search ................. 156/584, 156/344, 378, 379, 578
See application file for complete search history.

(56) References Cited

U.S. PATENT DOCUMENTS 5,167,752 A * 12/1992 Dowling ..................... 156/512
5,938,890 A * 8/1999 Schlinkmann et al. ...... 156/541
6,450,227 B1 * 9/2002 Labardi ....................... 156/351
2002/0040767 A1 * 4/2002 Yang .......................... 156/363
2004/0000369 A1 * 1/2004 Pituch et al. .................. 156/64

FOREIGN PATENT DOCUMENTS

| | | | |
|---|---|---|---|
| DE | 3430627 | A1 | 2/1986 |
| JP | 5-305932 | A | 11/1993 |
| JP | 7-37090 | A | 2/1995 |
| JP | 10-268777 | A | 10/1998 |
| JP | 2003-334872 | A | 11/2003 |
| JP | 2004-203453 | A | 7/2004 |

OTHER PUBLICATIONS

International Search Report of PCT/JP2005/013270, date of mailing Nov. 1, 2005.

* cited by examiner

*Primary Examiner*—George R Koch, III
(74) *Attorney, Agent, or Firm*—Westerman, Hattori, Daniels & Adrian, LLP

(57) ABSTRACT

The label making apparatus of the invention comprises a guide plate 17 for guiding a raw sheet M in a predetermined feeding direction, an inspecting device 15 for inspecting a label L on a release liner S constituting the raw sheet M, a transfer device 25 for partially bypassing the feeding direction of the release liner to peel off a label from the release liner and temporarily sticking the non-defective label at a position on the release liner advanced toward the downstream side in the feeding direction by a predetermined distance, and a collecting device 22 for collecting a defective when a defective label is detected. The transfer device 25 adjusts the bypass length of the release liner so that a certain interval is kept between the non-defective label after a defective label is detected with respect to the preceding non-defective label.

12 Claims, 5 Drawing Sheets

LABEL MAKING APPARATUS

This application is a national stage of PCT/JP2005/013270, filed on Jul. 20, 2005.

TECHNICAL FIELD

The present invention relates to a label making apparatus and more particularly to a label making apparatus which automatically inspects a printed surface, a shape and the like of a label and is capable of temporary sticking so that a defective label is collected and only non-defective label is located on a release liner with a certain interval.

BACKGROUND ART

Conventionally, such a label making apparatus has been known that a raw sheet in which labels are temporarily stuck on one surface of a release liner elongated in a strip state is used and predetermined printing can be made on the label surface in a process of feeding the raw sheet. In this label making apparatus, an inspecting device is provided at a predetermined position along the feeding direction of the raw sheet in order to check if defective printing exists on the label or not, or if abnormality exists or not in the planar shape of the label, and such an arrangement is employed that when abnormality of the label (defective label) is detected by the inspecting device, the defective label is peeled off from the release liner.

However, if the defective label is peeled off and removed, it brings about a missing-state where labels do not exist partially at positions where they should exist with a given interval. Therefore, that causes such disadvantage that missing sticking of labels occurs corresponding to the missing-state portion when the raw sheet is fed, and the labels are peeled off and stuck to an object in case that the raw sheet which has been inspected is applied to the label sticking device.

In order to prevent such missing-state, it is only necessary to change (transfer) a position where the non-defective label detected after the defective label is temporarily stuck so as to keep a given interval to the preceding non-defective label when the defective label is detected and removed.

In the meantime, Patent Document 1 discloses a label making apparatus which can transfer the label with respect to a release liner.

[Patent Document 1] Japanese Patent Publication No. (Hei) 7-37090

DISCLOSURE OF INVENTION

Problem to be Solved by the Invention

However, the label making apparatus disclosed in the Patent Document 1 is a transferring structure for displacing a die-cut trace on the release liner generated when a strip-state label raw sheet which is temporarily stuck on the strip-state release liner is die-cut and an outer circumferential end edge of a label. Thus, it is not a measure to prevent the missing-state generated after removal of the defective label.

An object of the present invention is to provide a label making apparatus capable of temporary sticking only of non-defective labels on a release liner even after a defective label is removed by sequentially transferring the non-defective labels to predetermined positions.

Means for Solving Problem

In order to achieve the above object, the present invention employs an arrangement of a label making apparatus in which labels are inspected in a process for feeding raw sheet on which the labels are temporarily stuck on a surface of a strip-state release liner with a certain interval, comprising:

a guide device for guiding the raw sheet in a predetermined feeding direction, an inspecting device arranged along the feeding direction of the raw sheet, a transfer device for peel off a non-defective label having passed this inspecting device from the release liner and temporarily sticking the non-defective label on the preceding releasing liner, and a collecting device for collecting a defective label when a defective is detected, wherein the transfer device temporarily sticks the subsequent non-defective label after the defective label is detected at a position with the certain interval with respect to-the preceding non-defective label.

Also, the present invention employs an arrangement of a label making apparatus in which labels are inspected in a process for feeding a raw sheet on which labels are temporarily stuck on a surface of a strip-state release liner with a certain interval, comprising:

a guide device for guiding the raw sheet in a predetermined feeding direction, an inspecting device arranged along the feeding direction of the raw sheet, a transfer device for partially bypassing the feeding direction of the release liner, peeling off a non-defective label having passed the inspecting device from the release liner and temporarily sticking the non-defective label at a position advanced toward the downstream side in the feeding direction by a predetermined distance, and a collecting device for collecting a defective label when a defective is detected, wherein the transfer device temporarily sticks the subsequent non-defective label after the defective label is detected at a position with the certain interval with respect to the preceding non-defective label by adjusting the bypass length of the release liner.

In the present invention, the guide device is provided with a guide plate for guiding the raw sheet in a substantial plane and for peeling off the label from the release liner at the downstream side end, wherein the transfer device may be comprised by a moving body arranged in the vicinity of the downstream side end of the guide plate for bypassing the feeding direction of the release liner, a moving plate arranged on the substantially same plane as the guide plate, and a driving device for moving forward/backward this moving plate with respect to the guide plate.

Also, the moving body may be comprised by a tension roll provided movably in a direction to expand the bypass length of the release liner when a defective label is detected.

Moreover, such an arrangement may be employed that a printing device arranged on the upstream side of the inspecting device is further included and the inspecting device detects a label printed surface.

Effect of the Invention

According to the present invention, since it is so arranged that when a defective label is detected by the inspecting device, the defective label can be removed by the collecting device, while a subsequent non-defective label is peeled off and transferred to a position with a certain interval to the preceding non-defective label on the release liner, when the raw sheet for which the label has been inspected is wound and applied to a separate label sticking device, for example, missing sticking of the label to the object can be avoided. Also, a similar effect can be also exerted without winding an inspected label, when a label sticking device is continued in a subsequent process.

Moreover, in the present invention, since the non-defective label is peeled off once after the inspection and temporarily stuck again on the preceding release liner, the label outer edge exactly complies with, the die-cut trace remaining on the release liner when forming a label by die-cutting in the preceding process and temporary sticking is not carried out, disadvantage will not occur such that an adhesive of the non-defective label enters the die-cut trace on the release liner.

BRIEF DESCRIPTION of DRAWINGS FIG. 1 is a schematic perspective view of a label making apparatus according to an embodiment.

DESCRIPTION OF NUMERICAL REFERENCE

10 Label making apparatus
15 Inspecting device
17 Guide plate (guiding device)
18 Moving plate (transfer device)
19 Driving device (transfer device)
21 Tension roll (transfer device)
22 Collecting device
25 Transfer device
40 Tension roll (transfer device)
S Release liner
P Printing device
M Raw sheet
L Label

BEST MODE FOR CARRYING OUT THE INVENTION

Hereinafter, an embodiment of the present invention will be described with reference to the accompanying drawings.

Figure 1:
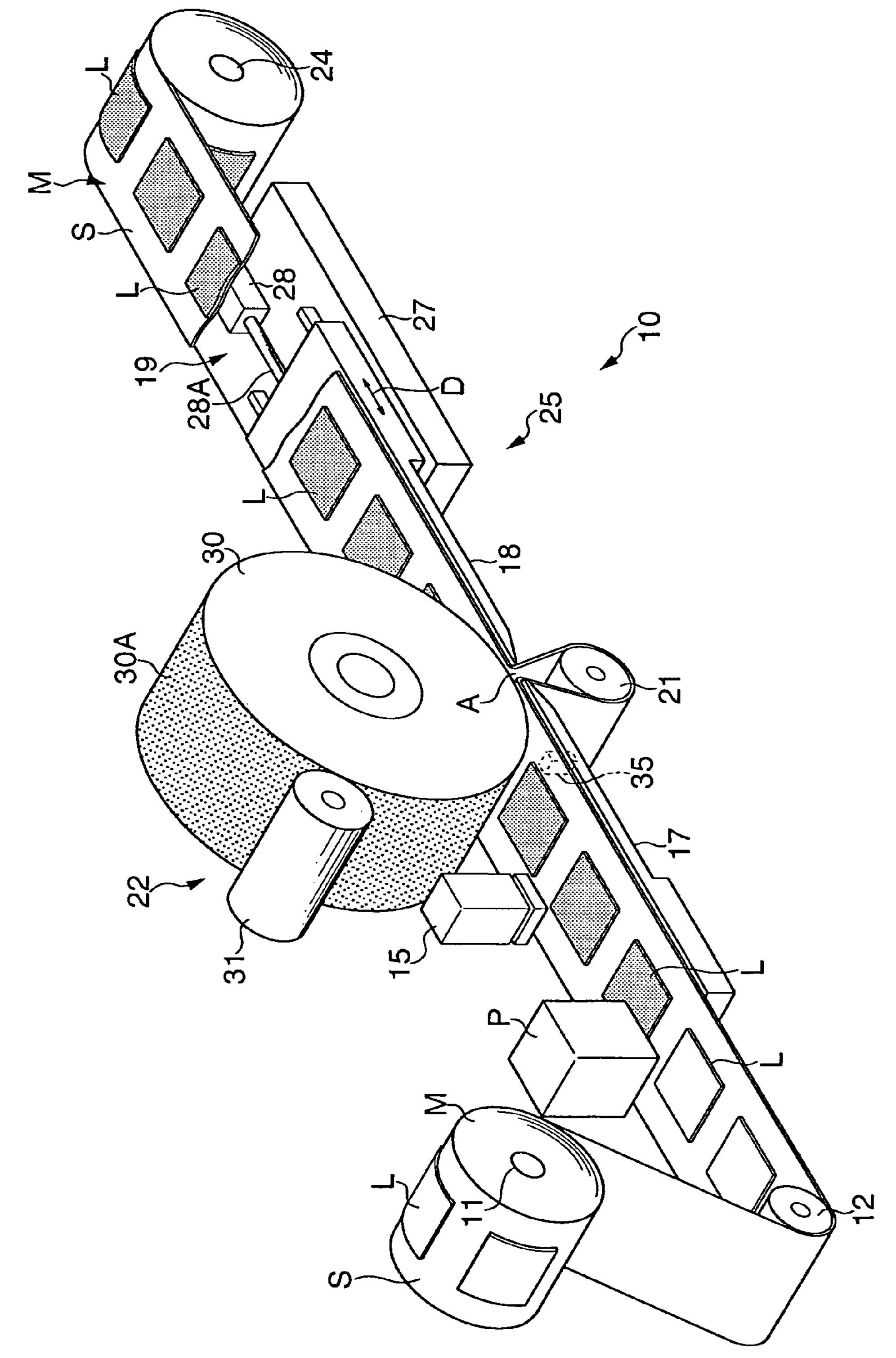

FIG. 1 shows a schematic perspective view of a label making apparatus according to the embodiment. In this figure, a label making apparatus 10 comprises a feed-out roll 11 for supporting a raw sheet M on which labels L are temporarily stuck with a certain interval on one surface of a strip-state release liner S, a guide roll 12 disposed below the feed-out roll 11 for guiding the raw sheet M in the substantially horizontal direction, a printing device P for carrying out predetermined printing on the surface of the label L (upper surface in FIG. 1) having passed this guide roll 12, an inspecting device 15 concomitantly provided at the printing device P and inspecting a printed surface of the label L, a guide plate 17 as a guiding device for guiding the raw sheet M in the substantially horizontal direction enabling peeling off the label L from the release liner S at the downstream side end (right side end in FIG. 1), a moving plate 18 disposed in the substantially same plane as the guide plate 17, a driving device 19 for moving the moving plate 18 forward/backward with respect to the guide plate 17, a tension roll 21 as a moving body disposed immediately below a clearance A between the guide plate 17 and the moving plate 18, bypassing the feed-out direction of the release liner S, a collecting device 22 for collecting the label L determined as defective by the inspecting device 15, and a winding roll 24 for applying a feed-out force to the raw sheet M and for intermittently winding the raw sheet M in the state only the non-defective label L is temporarily stuck to the release liner S with a certain interval. Here, a transfer device 25 is comprised by the moving plate 18, the driving device 19 and the tension roll 21 for temporarily sticking the subsequent non-defective label L at a position with a certain interval to the preceding non-defective label L. Though not shown, each of the component devices or parts is supported -by a frame, not shown, and constitutes the label making apparatus 10 as a single unit.

The feed-out roll 11 is connected to an output shaft of a motor capable of torque control, not shown, so as to allow a constant -rotation resistance applied and the raw sheet M is fed out without sagging.

The printing device P is comprised by a non-contact type printer made of an ink-jet printer or the like, for example. Since feeding out of the raw sheet M in this embodiment is carried out intermittently, the printer does not necessarily have to be a non-contact type printing device, but a contact-type printing device such as a letterpress printing, flexographic printing, offset printing or the like may be employed. Also, in the case of continuous feeding, a contact-type printing device can be employed by providing a buffer area in the raw sheet M.

The inspecting device 15 inspects the printed surface of the label L printed by the printing device P and is comprised by an image processing device including a CCD camera and the like so as to determine quality of printing by comparing image data stored in advance and image capturing data on the printed surface. This inspection result is outputted to a control device, not shown, and the control device outputs a predetermined control signal to each portion of the apparatus.

Figure 2:
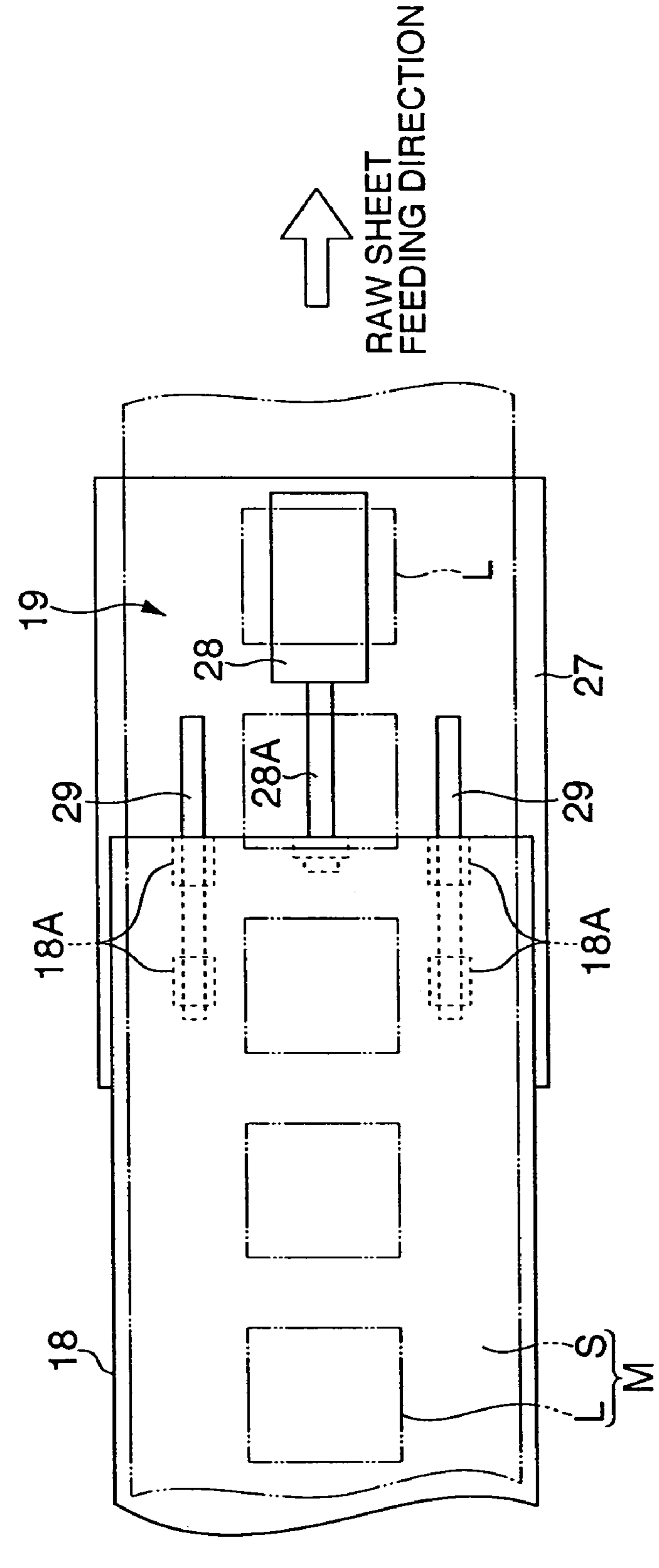
FIG. 2 is a plan view of a driving device in the embodiment.

In the guide plate 17, the upper surface side is formed as a guiding surface of the raw sheet M, and the right end in the downstream side is formed with an acute angle to function as a peel plate. The moving plate 18 is, as shown in FIG. 2, provided on the substantially same planar shape as the guide plate 17, and sliders 18A are mounted on the bottom surface in the right two each in the width direction.

The driving device 19 is comprised by a cylinder 28 supported on the upper surface of a base member 27 located on the bottom surface side of the moving plate 18 and two guide rails 29, 29 for guiding the slider 18A. A piston rod 28A of the cylinder 28 is connected to the downstream end side in the feed-out direction of the moving plate 18, and the moving plate 18 is made capable of advance/retreat in the direction of an arrow D in FIG. 1 by moving forward/backward of the piston rod 28A, by which the clearance A can be expanded/reduced.

The tension roll 21 is supported by a uniaxial robot, not shown, and in this embodiment, it is arranged to be lowered toward below in the substantially vertical direction per predetermined distance so as to expand the distance bypassing the release liner S.

Figure 3:
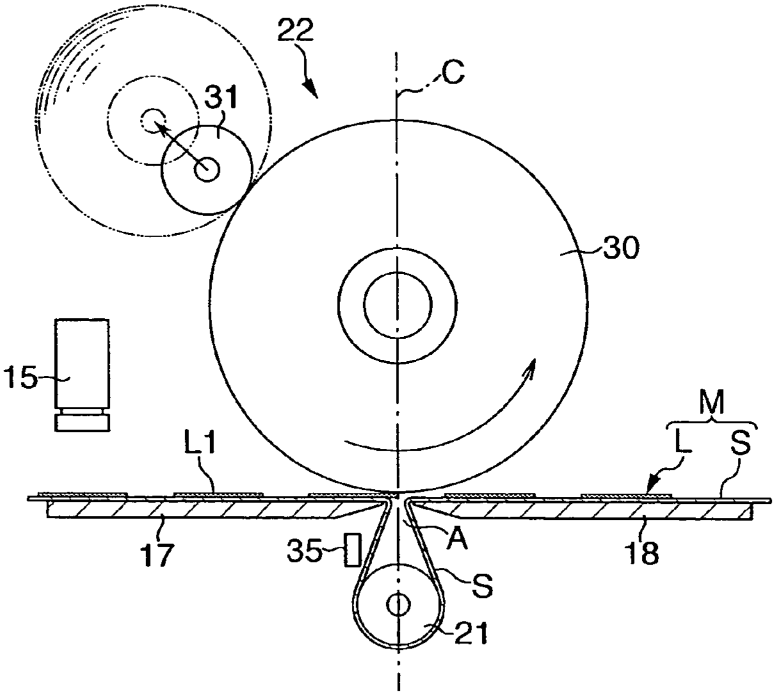
FIG. 3 is a front view of an essential portion for explaining operation of the embodiment.
Figure 4:
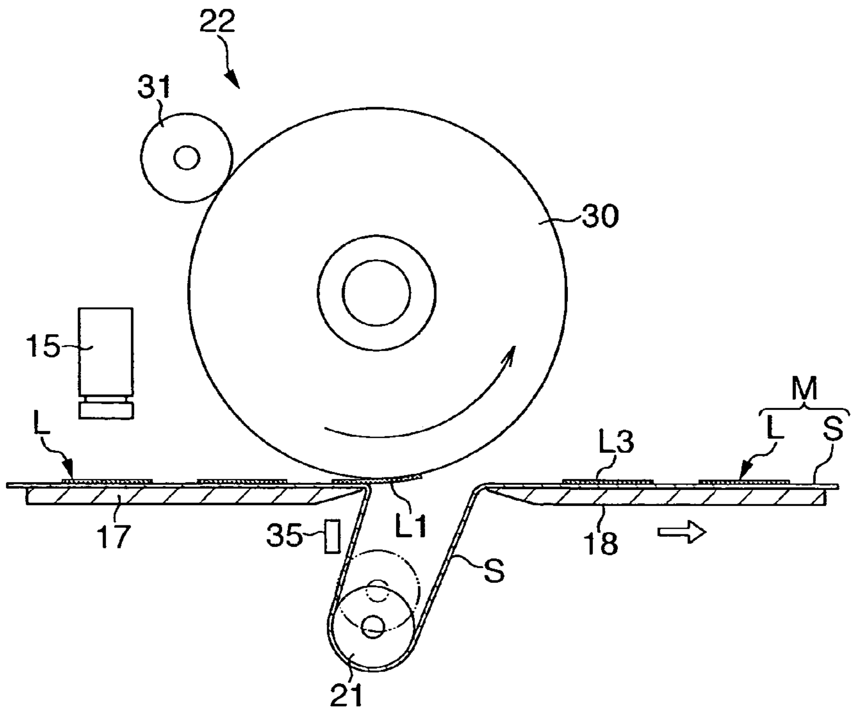
FIG. 4 is a front view of an essential portion showing a state where transfer of a defective label is prevented.
Figure 5:
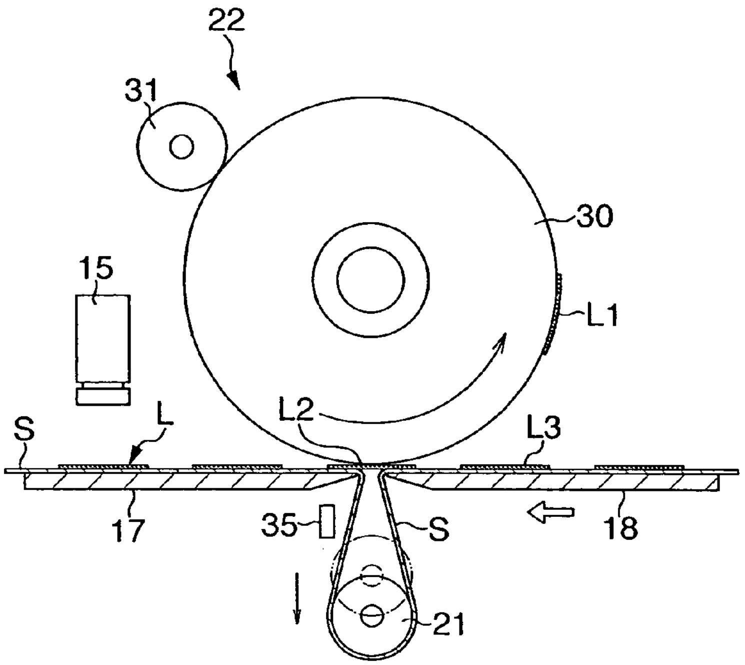
FIG. 5 is a front view of an essential portion showing a state where a defective label is collected by a suction drum.
Figure 6:
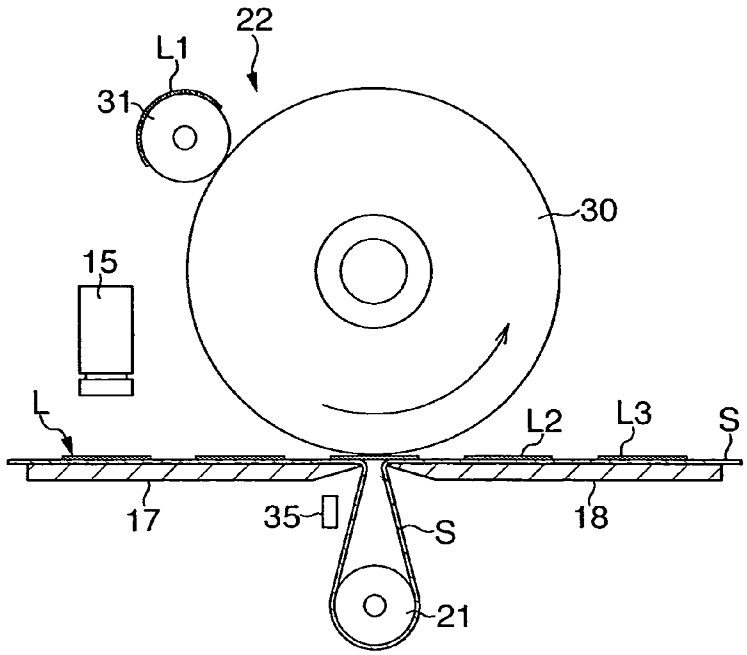
FIG. 6 is a front view of an essential part showing a state where a defective label is collected by a defective-label collecting roll.

The collecting device 22 is not particularly limited but comprises a suction drum 30 having a rotation center on a virtual vertical line C (See FIG. 3) passing through the clearance A and a defective-label collecting roll 31 in contact with the outer circumferential surface of this suction drum 30. As shown in FIG. 1, the suction drum 30 is formed in the circumferential surface thereof with a large number of suction holes 30A and is connected to a decompression device, not shown, so that the defective label L is sucked through the suction holes 30A. The suction force is set to an extent smaller than an adhesive force of the label L to the release liner S. Also, the defective-label collecting roll 31 is urged all the time toward the outer circumferential surface of the suction drum 30 through a damper device, not shown. This defective-label collecting roll 31 is, as shown by a two-dotted chain line in FIG. 3, provided movably to the outside according to expansion of the outer diameter with increase of the defective label L transferred to the outer circumferential surface, and when the defective labels L are transferred to the defective-label collecting roll 31 and accumulated thereon, the defective labels L are removed from the defective-label recovering roll 31.

The winding roll 24 is connected to an output shaft of a motor, not shown. This winding roll 24 winds the raw sheet M after only the non-defective label L is transferred to the release liner S by intermittent rotation of the motor, while it applies an intermittent feed-out force to the raw sheet M-supported by the feed-out roll 11.

A photo sensor 35 is disposed on the bottom surface side of the guide plate 17, and the photo sensor 35 is arranged to detect a front end or a rear end of the label L. Therefore, though not shown here, a notch portion corresponding to the photo sensor 35 is formed at the downstream side portion of the guide plate 17.

Next, a general operation of the label making apparatus 10 in this embodiment will be described referring to FIGS. 3 to 6.

The intermittent feed-out of the label L may be set so that, as shown in FIG. 3, the front end of the label L is located on the virtual vertical line C at every feeding out, for example. Here, supposing that a label L1 subsequent to the label L located on the virtual vertical line C in FIG. 3 is detected in advance as a defective label by the inspecting device 15, the data is sent to the control device, not shown, and when the front end of the defective label L1 in the feed-out direction is detected by the photo sensor 35, the moving plate 18 is moved to the downstream side (right side) through the driving device 19 so that the defective label L1 is kept not to be transferred. And the suction drum 30 sucked the defective label L1 (See FIG. 4), the tension roll shaft 21 is lowered by a predetermined amount from the two-dotted chain line position in FIG. 4 to a position shown by a solid line, that is, so as to absorb 1 pitch of the label L, not shown, to expand the bypass length of the release liner S through the uniaxial robot (See FIG. 5).

Then, after the suction drum 30 sucks the defective label L and rotates a certain amount, the moving plate 18 is returned to a position where an initial clearance A is formed through the driving device 19. Then, if a subsequent label L2 following this defective label L1 is non-defective, transfer of the subsequent non-defective label L2 is allowed, and it is temporarily attached at a position with a certain interval to the preceding non-defective label L3. At this time, since the suction force of the suction drum 30 is set smaller than the adhesive force of the label L to the release liner S, the non-defective label L2 is not collected by sucking of the suction drum 30.

Through the similar process after that, the label L is inspected sequentially and every time a defect of the label L is inspected, the tension roll 21 is lowered in stages for adjustment in the direction to expand the bypass amount of the release liner S.

Therefore, according to this embodiment, the predetermined printing is made on the upper surface of the label L, any defect of the printing is inspected by the inspecting device 15, and only the non-defective label L is transferred onto the preceding release liner S, which can be wound by the winding roll 24. Therefore, the wound raw sheet M has only non-defective labels without missing-state and when the raw sheet M is set on the label sticking device, only the non-defective labels L can be applied to the object surely one by one without missing sticking on the object, which can provide a label making apparatus exerting the above unprecedented excellent effect.

As mentioned above, the best arrangement, method and the like to put the present invention into practice has been disclosed, but the present invention is not limited to this.

That is, the present invention has been particularly illustrated and described mainly relating to a specific embodiment, but those skilled in the art can make changes as necessary in the shape, position, arrangement and the like of the above-mentioned embodiment without departing from the technical idea and the scope of object of the present invention.

Figure 7:
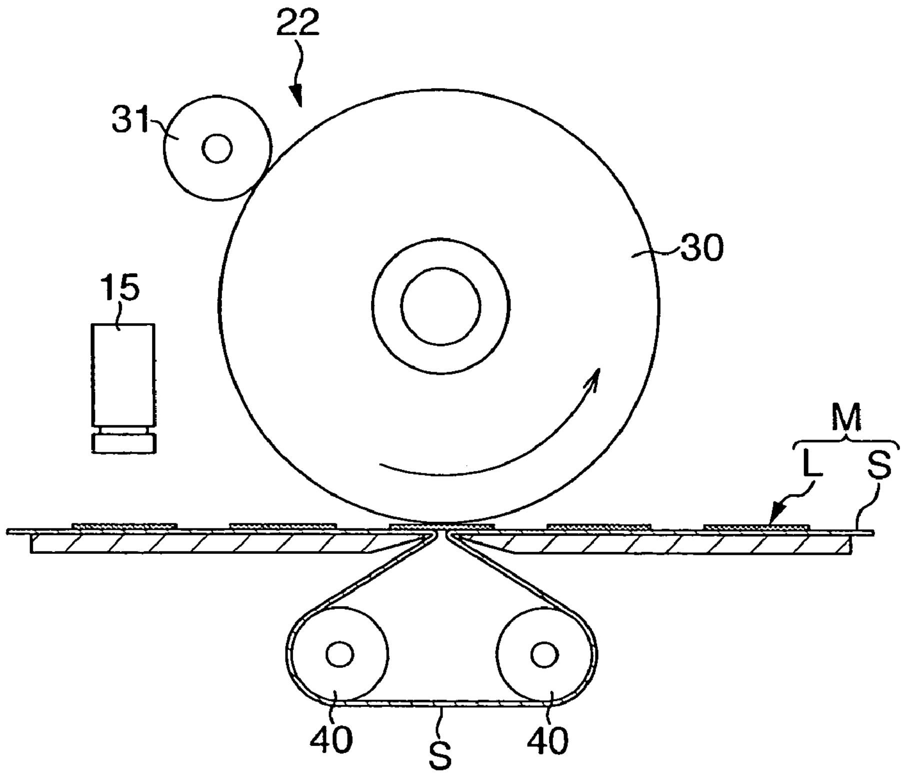
FIG. 7 is a front view of an essential portion showing a variation of the embodiment.

For example, a case where there is only one tension roll 21 is illustrated and described in the above embodiment, but as shown in FIG. 7, a pair of tension rolls 40, 40 may be employed and arranged so that the tension roll shafts 40, 40 are moved in the separating direction in stages every time a defective label L is detected.

Also, an arrangement may be employed that the release liner S is wound after passing through the guide plate 17 and another strip-state second release liner is made capable of feeding out onto the moving plate 18 and a lead end is wound by a winding roll 24 so that the non-defective label L is transferred to the second release liner. Also, in the case of this arrangement, the design change of the transfer device 25 is made possible. That is, a transfer robot provided with an appropriate suction head is provided separately, and the non-defective label L is sucked and separated by this transfer robot to be transferred with a certain interval to the non-defective label on the second release liner. In brief, it is only necessary that the present invention is an arrangement of transfer so that when a single defective label is detected and removed/collected, a subsequent non-defective label does not come to a position delayed by the portion of the single label from the preceding non-defective label due to the defective label, that is, a missing-state is not generated.

Also, this embodiment is arranged so that the raw sheet M on which the label L is formed in advance on the surface of the release liner S supported by the feed-out roll 11, but a release liner S on which a label base material forming the similar strip state as the release liner S temporarily stuck may be used, and a cutting processing in the label shape is applied in the process to feed out the sheet and an outer label base material portion which becomes unnecessary is collected, after which printing is carried out. Also, an object to be inspected by the inspecting device 15 is not limited to the printed surface but includes a label shape.

The invention claimed is:

1. A label making apparatus in which labels are inspected in a process for feeding a raw sheet on which the labels are temporarily stuck on a surface of a strip-state release liner with a certain interval, said label making apparatus comprising:

a guide device for guiding the raw sheet in a predetermined feeding direction;

an inspecting device arranged along the feeding direction of the raw sheet;

a transfer device for peeling off a non-defective label having passed said inspecting device from said release liner and temporarily sticking said non-defective label on the preceding release liner; and a collecting device for collecting a defective label when a defective label is detected, wherein said transfer device temporarily sticks the subsequent non-defective label after said defective label is detected at a position with the certain interval with respect to the preceding non-defective label.

2. The label making apparatus according to claim 1, wherein said guide device is provided with a guide plate for guiding the raw sheet in a substantial plane and for peeling off said label from the release liner at the downstream side end, and said transfer device comprises a moving body arranged in the vicinity of the downstream side end of said guide plate for bypassing the feeding direction of said release liner, a moving plate arranged on the substantially same plane as said guide plate, and a driving device for moving forward/backward this moving plate with respect to said guide plate.

3. The label making apparatus according to claim 2, wherein said moving body comprises a tension roll provided movably in a direction to expand the bypass length of said release liner when a defective label is detected.

4. The label making apparatus according to claim 3, further comprising a printing device arranged on the upstream side of said inspecting device, the inspecting device capable of detecting a label printed surface.

5. The label making apparatus according to claim 2, further comprising a printing device arranged on the upstream side of said inspecting device, the inspecting device capable of detecting a label printed surface.

6. The label making apparatus according to claim 1, further comprising a printing device arranged on the upstream side of said inspecting device, the inspecting device capable of detecting a label printed surface.

7. A label making apparatus in which labels are inspected in a process for feeding a raw sheet on which the labels are temporarily stuck on a surface of a strip-state release liner with a certain interval, said label making apparatus comprising:

a guide device for guiding the raw sheet in a predetermined feeding direction;

an inspecting device arranged along the feeding direction of the raw sheet;

a transfer device for partially bypassing the feeding direction of said release liner, peeling off a non-defective label having passed said inspecting device from said release liner and temporarily sticking said non-defective label at a position advanced toward the downstream side in the feeding direction by a predetermined distance; and a collecting device for collecting a defective label when a defective label is detected, wherein said transfer device temporarily sticks the subsequent non-defective label after the defective label is detected at a position with the certain interval with respect to the preceding non-defective label by adjusting the bypass length of the release liner.

8. The label making apparatus according to claim 7, further comprising a printing device arranged on the upstream side of said inspecting device, the inspecting device capable of detecting a label printed surface.

9. The label making apparatus according to claim 7, wherein said guide device is provided with a guide plate for guiding the raw sheet in a substantial plane and for peeling off said label from the release liner at the downstream side end, and said transfer device comprises a moving body arranged in the vicinity of the downstream side end of said guide plate for bypassing the feeding direction of said release liner, a moving plate arranged on the substantially same plane as said guide plate, and a driving device for moving forward/backward this moving plate with respect to said guide plate.

10. The label making apparatus according to claim 9, further comprising a printing device arranged on the upstream side of said inspecting device, the inspecting device capable of detecting a label printed surface.

11. A label making apparatus in which labels are inspected in a process for feeding a raw sheet on which the labels are temporarily stuck on a surface of a strip-state release liner with a certain interval, said label making apparatus comprising:

a guide device for guiding the raw sheet in a predetermined feeding direction;

an inspecting device arranged along the feeding direction of the raw sheet;

a transfer device for partially bypassing the feeding direction of said release liner, peeling off a non-defective label having passed said inspecting device from said release liner and temporarily sticking said non-defective label at a position advanced toward the downstream side in the feeding direction by a predetermined distance; and a collecting device for collecting a defective label when a defective label is detected, wherein said transfer device temporarily sticks the subsequent non-defective label after the defective label is detected at a position with the certain interval with respect to the preceding non-defective label by adjusting the bypass length of the release liner in response to the detection of the defective label.

12. The label making apparatus according to claim 11, wherein said guide device is provided with a guide plate for guiding the raw sheet in a substantial plane and for peeling off said label from the release liner at the downstream side end, said transfer device comprises a moving body arranged in the vicinity of the downstream side end of said guide plate for bypassing the feeding direction of said release liner, a moving plate arranged on the substantially same plane as said guide plate, and a driving device for moving forward/backward this moving plate with respect to said guide plate, and said moving body comprises a pair of tension rolls provided movably in a direction to expand the bypass length of said release liner when said defective label is detected.

* * * * *